R. W. MOORE.
CRYSTAL PRODUCTION.
APPLICATION FILED FEB. 26, 1918.
1,347,350.
Patented July 20, 1920.
Fig. 1.
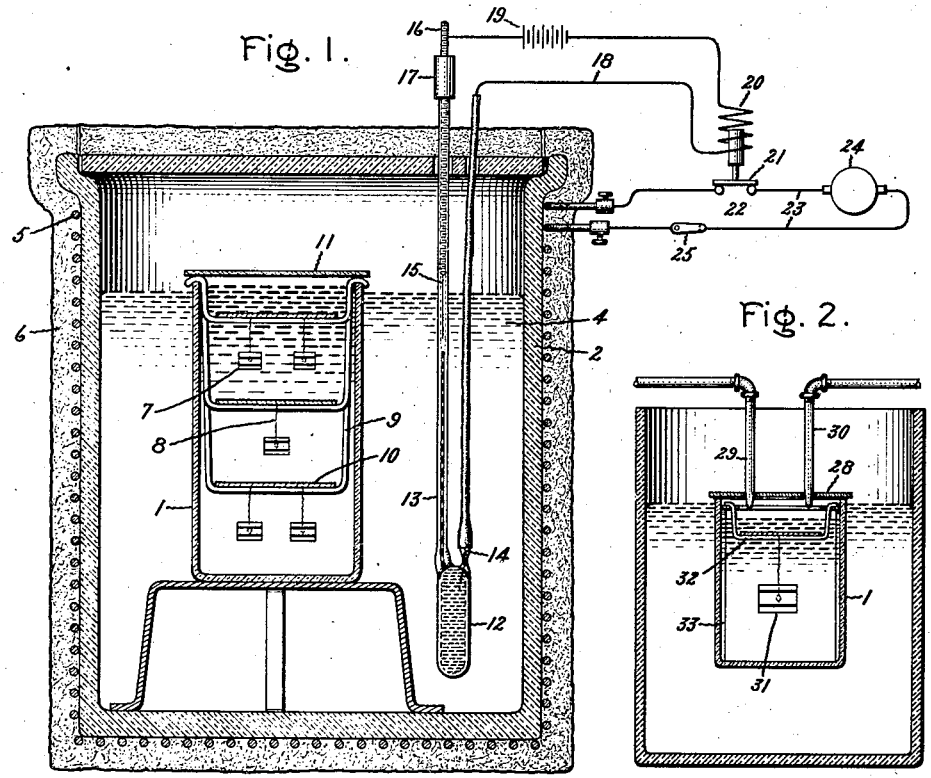
Fig. 2.
Fig. 3.
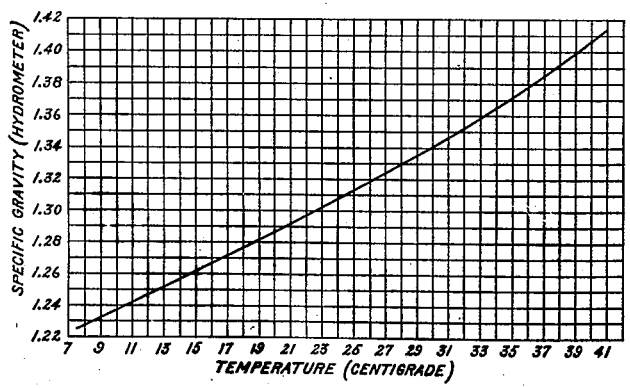
Fig. 4.
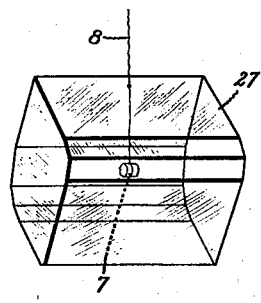
Inventor:
Roy W. Moore,
by *[signature]*
His Attorney.

UNITED STATES PATENT OFFICE.

ROY W. MOORE, OF SCHENECTADY, NEW YORK, ASSIGNOR TO GENERAL ELECTRIC COMPANY, A CORPORATION OF NEW YORK.

CRYSTAL PRODUCTION.

1,347,350.  Specification of Letters Patent.  Patented July 20, 1920.

Application filed February 26, 1918. Serial No. 219,312.

*To all whom it may concern:*

Be it known that I, ROY W. MOORE, a citizen of the United States, residing at Schenectady, in the county of Schenectady, State of New York, have invented certain new and useful Improvements in Crystal Production, of which the following is a specification.

The present invention comprises a method of and apparatus for growing clear crystals; in other words, crystals having a uniform orientation.

According to one method whereby large irregular crystals of alum have been produced, small crystals have been suspended in a saturated solution, which was allowed to evaporate at will and as it evaporated the small crystal increased in size and formed large crystal aggregates. When using a substance so well suited for crystallization as alum, large more or less irregular crystal fragments could be thus produced. This procedure is not suited, however, for the production of structurally uniform crystals of large size even when so favorable a material as alum is crystallized.

I have found that crystals of various substances can be produced of greater size and perfection than heretofore by controlling both the temperature and the evaporation of the solution or mother liquor to produce and maintain by such control a slight degree of supersaturation in the solution which I have found to be favorable for regular crystallization. By carefully maintaining the degree of supersaturation below the point of irregular crystallization, perfectly developed clear crystals of large size may be formed which continue to grow clear and perfect as long as a suitable state of supersaturation is maintained.

In the accompanying drawing Figure 1 is a vertical section of one form of apparatus for carrying out my invention; Fig. 2 illustrates a modified apparatus; Fig. 3 is a curve expressing the relation between specific gravity and saturation temperature of a solution, and Fig. 4 is a perspective view of a crystal produced by my new method.

According to the preferred method of carrying out my invention for the production of large crystals of a chosen material, for example, of Rochelle salt (sodium potassium tartrate), a saturated solution of the salt is made up at some convenient temperature, for example, at about 32 to 35° C. After the solution has been removed from the excess of salt, the temperature is raised to about 7 to 8° C. above the saturation temperature and the solution is filtered. In some cases the solution is thereupon subjected to a vacuum in order to remove dissolved air but this is not absolutely necessary. Before crystallization involving exact temperature control, it is necessary to know exactly at what temperature a given solution will begin to crystallize. Although this might be determined by trial for a given concentration and this concentration thereafter reproduced, it is more convenient to proceed as follows:

The specific gravity of solutions of a given substance is determined at various temperatures over a range of temperatures, say, five degrees apart, and the results are plotted as a curve. For example, Fig. 3 illustrates a curve thus obtained with Rochelle salt, the ordinates represent the specific gravity as determined by a hydrometer and the abscissæ the corresponding temperatures. From this curve the temperature of saturation of a solution may be found by determining the specific gravity, allowance being made for the fact that the specific gravity is determined at a temperature somewhat above the saturation temperature. The specific gravity changes about 0.0005 for a change of one degree in temperature.

When ready for crystallization the solution is introduced into a jar 1 located within a tank 2 provided with a cover 3. Within the tank 2 and around the jar 1 is a suitable bath 4, such as water which serves as a heat reservoir in order to stabilize the temperature of the solution in which crystal growth is to be produced. In suitable thermal relation to the heat reservoir for example, surrounding the tank 2 as illustrated, is an electric resistance heater 5. The tank is well heat-insulated, for example, by a surrounding layer of felt 6, or other suitable material.

Crystallization may be begun in this solution spontaneously by simply lowering the temperature as will be hereinafter described, but I prefer to start crystallization upon some crystalline particles 7 suspended by a fine thread or very fine wire 8 from supports 9, which conveniently may consist of glass rods. These crystalline particles or seed crystals consist preferably of small crystals or crystal fragments of the material to be crystallized, but they may also consist of small crystals or crystal fragments of some other material which is isomorphous with the material to be crystallized. Preferably these crystal fragments are hung in zones at different heights from the bottom of the receptacle 1, and preferably a shield 10 of glass, or other suitable material, is placed upon the supports 9 above the seed crystals to protect the growing crystals from chance crystals which form spontaneously in the solution. The jar 1 preferably is covered with a plate 11.

When using about eight to ten liters of solution from which to grow crystals, I prefer to place into the solution about fifteen seed crystals hung in three zones and located apart as far as practicable. If more than this number are grown the crystals are likely to come into contact as they increase in size thereby causing defects. A smaller number of crystals of course will enable crystals to be grown to larger size, but the rate of growth should be slower.

The temperature of the bath 4 in the tank 2 should be about $0.5°$ above the saturation temperature of the solution in the jar 1. The temperature of the apparatus after being assembled, as above described, is allowed to fall to practically the saturation temperature of the solution by natural cooling and then the rate of cooling is so controlled that the temperature of the entire apparatus will drop about $0.1°$ C. per day until a noticeable increase in size of the seed crystals has occurred.

In order to accurately control the temperature, I employ a sensitive thermostat such, for example, as shown in the drawing. This thermostat consists of a bulb 12 containing mercury which communicates with a tube 13. Electrical contact to the mercury in the bulb 12 is made by means of a wire 14 sealed into the wall of the bulb. The bore of tube 13 containing the mercury column, is of capillary dimension. The upper part of the bore is somewhat wider, and contains a fine wire 15 connected to a screw-threaded rod 16. Upon this screw-threaded rod is a rotatable nut 17 by the rotation of which the screw-threaded rod is raised or lowered. When the water bath is at a desired temperature of saturation, which can accurately be determined by a sensitive thermometer, the sleeve 17 is adjusted so that the electrical contact is made by the wire 15 to the mercury thread in the capillary tube 12. The rod 16 and the conductor 13 are connected to a relay circuit containing a battery 19 and a relay magnet 20. The movable contact 21 of this relay circuit coöperates with stationary contacts 22 so as to open and close by its movements the heater circuit 23. In this circuit 23 is a suitable source of electrical energy, such as a generator 24, which may also be switched in and out of circuit with a manually operated switch 25.

When the temperature of the apparatus falls a few hundredths of a degree contact between the wire 15 and the mercury thread in the tube 13 is interrupted causing the relay magnet 20 to release its armature and close the heater circuit, thereupon raising the temperature of the apparatus until the contact of the mercury thread and the wire 15 is reëstablished. By this means the temperature is maintained constant within about $0.05°$ C. It is to be understood that the described thermostat is shown for the purpose of illustration only and any other suitable means for accurately controlling the temperature may be employed.

When the apparatus is adjusted and functionates properly at the saturation temperature the thermostat setting is changed to lower the temperature $0.1°$ C. to produce a slight supersaturation and thereby causing growth of the seed crystals. As the growth of crystal or crystals in the solution withdraws some of the material from solution, the favorable degree of supersaturation must be maintained and preferably this is done by reducing the temperature.

After increase in size of the seed crystals has become noticeable, the thermostat is adjusted to permit a fall of temperature of about $0.2°$ C. per day. The setting is changed $0.1°$ C. about every twelve hours. After the crystals have increased to a size three-fourths inch to one inch in length, the temperature of the bath may fall about 0.3 to $0.4°$ per day, and when the crystals are well over one inch in length the decrease in temperature may be $0.5°$ to $0.6°$ per day, the setting of the thermostat being changed twice each day. When the solution has cooled to about room temperature the crystals are removed from the mother liquor and are dried by wiping with a soft, dry cloth.

A crystal 27 of Rochelle salt is shown in Fig. 4, built up about the nuclear crystal 7, but it should be understood that the size of the crystal in the drawing is of no significance as larger crystals may be grown than represented in the drawing.

In some cases the crystals may be grown by placing the seed crystals on glass plates so as to avoid the use of suspension thread, and while the crystals will grow clear and uniformly under these conditions the resulting large crystals are only partially developed as the side adjacent the glass does not develop. In some cases clear, perfect crystals of fair size will develop from chance crystallization under the described conditions.

In some cases, as shown in Fig. 2, the degree of supersaturation of the solution may be controlled by maintaining the temperature constant and controlling the evaporation. For this purpose the solution may be placed in a jar 1 containing a tightly fitting cover 28, through which project two tubes 29, 30. Air or other gas, of a constant low humidity may be conveyed into the space above the solution in jar 1 at a predetermined constant rate by one tube, say 29, and carried away by another tube, say 30. As the evaporation will vary with the volume and velocity of the gas stream, the volume of the solution and the character of the material to be crystallized, no exact directions can be given other than to say that the evaporation should occur at such rate that the favorable supersaturation is maintained without causing it to proceed so far as to cause irregular crystallization. The temperature of the bath 4 surrounding the jar 1 is maintained constant by a thermostat as shown in Fig. 1. The setting of the thermostat may either remain unchanged, or may be changed a predetermined amount to lower the temperature coincident with the evaporation of the solvent. A single crystal 31 suspended from a support 32, resting on a standard 33 has been shown as developing the apparatus illustrated by Fig. 2 but, of course, a greater number may be grown as shown in Fig. 1.

Crystals made in accordance with my invention are of particular utility in scientific apparatus, utilizing the Piezo-electric effect.

What I claim as new and desire to secure by Letters Patent of the United States, is:—

1. The method of producing crystals which consists in producing supersaturation in a solution of the material to be crystallized, maintaining said solution supersaturated when crystallization has begun but holding the degree of supersaturation of said solution below the point at which irregular crystallization occurs.

2. The method of producing regular crystals which consists in producing supersaturation in a solution of a material to be crystallized until crystallization begins, and lowering the temperature at a rate of less than one degree per day to maintain said state of supersaturation suitable for continued crystal growth while preventing evaporation of said solution.

3. The method of growing crystals which consists in suspending a crystalline particle isomorphous with the crystal desired into a solution to be crystallized, producing supersaturation in said solution until crystal growth occurs, and lowering the temperature at a rate adapted to maintain concentration at the point at which regular crystallization occurs around said particle as the concentration of the solution decreases.

4. The method of producing regular crystals which consists in placing a crystalline particle of the material to be crystallized into a nearly saturated solution of said material, substantially preventing evaporation of solvent from said solution, controllably lowering the temperature of said solution at a rate which will produce supersaturation sufficient to induce regular crystal growth upon said particle as a nucleus while preventing a degree of supersaturation which will produce irregular crystallization.

5. The method of growing crystals which consists in placing in contact with a nearly saturated solution of the material to be crystallized, a crystalline particle which is isomorphous with said material, producing supersaturation in said solution and controllably heating and cooling the solution as the concentration decreases due to crystalline growth to progressively lower the temperature at a rate adapted to maintain a desired supersaturation favorable for crystal growth on said particle but below the point at which irregular crystallization occurs.

6. The method of producing crystals which consists in placing into contact with a solution of the material to be crystallized a crystalline particle which is isomorphous with said material, substantially preventing evaporation of the solvent from said solution, producing supersaturation and maintaining the degree of supersaturation thereof within the limits at which crystal growth occurs by a progressive lowering of temperature at a rate which will prevent the supersaturation to become great enough to cause irregular crystal formation.

7. The method of producing regular crystals which consists in placing a crystalline particle of the material to be crystallized into a solution having a temperature several degrees above the saturation temperature for the given concentration, substantially preventing evaporation of solvent from said solution, lowering the temperature to substantially the saturation temperature, thereafter lowering the temperature about 0.1° C. per day until noticeable crystal growth on said particle has taken place, and thereupon gradually increasing the rate of cooling as the size of the crystal increases.

8. The method of producing large clear crystals of Rochelle salt which consists in placing a crystalline particle of said salt in contact with a nearly saturated solution of said salt, producing supersaturation of said solution by lowering the temperature until crystal growth takes place on said particle and preventing irregular crystallization by causing the cooling of said solution to occur at such rate that excessive supersaturation is prevented.

In witness whereof, I have hereunto set my hand this 25th day of February, 1918.

ROY W. MOORE,